United States Patent
Deferme

(10) Patent No.: US 11,359,648 B2
(45) Date of Patent: Jun. 14, 2022

(54) ACCUMULATOR WITH FLEXIBLE INFLATABLE CONTAINER

(71) Applicant: Tenneco Automotive Operating Company Inc., Lake Forest, IL (US)

(72) Inventor: Stefan Deferme, Heusden-Zolder (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 133 days.

(21) Appl. No.: 16/818,233

(22) Filed: Mar. 13, 2020

(65) Prior Publication Data

US 2020/0378410 A1 Dec. 3, 2020

Related U.S. Application Data

(60) Provisional application No. 62/855,176, filed on May 31, 2019.

(51) Int. Cl.
*F15B 1/16* (2006.01)
*F15B 15/10* (2006.01)
(Continued)

(52) U.S. Cl.
CPC .............. *F15B 1/165* (2013.01); *B60G 11/30* (2013.01); *F15B 1/04* (2013.01); *F15B 7/10* (2013.01);
(Continued)

(58) Field of Classification Search
CPC .............. F15B 1/021; F15B 2201/3152; F15B 2201/315; F15B 2201/3151; F15B 2201/3154; F15B 2201/3156; F15B 2201/3158; F15B 2201/40; F15B 2201/405; F15B 2201/4056; F15B 2201/41;
(Continued)

(56) References Cited

U.S. PATENT DOCUMENTS 2,401,792 A * 6/1946 Overbeke ............. F16L 55/053
138/30
2,540,676 A * 2/1951 Johnson et al. ........ B60T 17/06
138/30
(Continued)

FOREIGN PATENT DOCUMENTS

EP 0533527 B1 12/1995
FR 2841318 B1 12/2005
GB 636093 A 4/1950

*Primary Examiner* — Dustin T Nguyen
(74) *Attorney, Agent, or Firm* — Harness, Dickey & Pierce, P.L.C.

(57) ABSTRACT

An accumulator includes a housing, a flexible bladder and a support. The housing includes a chamber having a defined volume and a passage extending through the housing. The flexible bladder is positioned within the chamber and contains a compressible gas. The bladder being operable in an expanded condition and a partially collapsed condition. The support is positioned in the chamber and engages the flexible bladder when the flexible bladder is in the expanded condition. Liquid is positioned in the chamber and in contact with the flexible bladder. A volume of the liquid within the chamber is at a minimum when the flexible bladder is in the expanded condition. The volume of liquid within the chamber increases as a pressure of the liquid increases to compress the gas and operate the flexible bladder in the partially collapsed condition.

16 Claims, 13 Drawing Sheets

(51) Int. Cl.
*F15B 1/04* (2006.01)
*F15B 7/10* (2006.01)
*B60G 11/30* (2006.01)

(52) U.S. Cl.
CPC ...... *F15B 15/103* (2013.01); *B60G 2202/154* (2013.01); *B60G 2206/422* (2013.01); *F15B 2201/205* (2013.01); *F15B 2201/3152* (2013.01); *F15B 2201/32* (2013.01); *F15B 2201/4056* (2013.01)

(58) Field of Classification Search
CPC .......... F15B 2201/413; F15B 2201/415; F15B 2201/43; F15B 2201/435; F15B 2201/60; F15B 2201/605; F15B 2201/61; F15B 2201/615; F15B 1/10; F15B 1/103; F15B 1/106; F15B 1/12; F15B 1/125; F15B 1/14; F15B 1/16; F15B 1/165; F15B 1/18; F15B 1/20; F15B 1/22; F16L 55/053
See application file for complete search history.

(56) References Cited

U.S. PATENT DOCUMENTS

| | | | |
|---|---|---|---|
| 2,781,869 A | | 2/1957 | Boehm et al. |
| 3,024,875 A | | 3/1962 | Stultz |
| 3,027,600 A | | 4/1962 | Stormer et al. |
| 3,625,321 A | | 12/1971 | Lutz |
| 3,961,646 A | * | 6/1976 | Schon .................. F16L 55/052 138/30 |
| 6,450,307 B2 | | 9/2002 | Lutz |

* cited by examiner

ACCUMULATOR WITH FLEXIBLE INFLATABLE CONTAINER

CROSS-REFERENCE TO RELATED APPLICATIONS

This application claims the benefit of U.S. Provisional Application No. 62/855,176, filed on May 31, 2019. The entire disclosure of the above application is incorporated herein by reference.

FIELD

The present disclosure relates to an accumulator with a flexible inflatable container.

BACKGROUND

This section provides background information related to the present disclosure and is not necessarily prior art.

A hydraulic accumulator is an energy storage device. Accumulators may be configured as "gas-over oil" mechanisms associated with vehicle dampers. A compressible gas acts as an energy storage mechanism on the incompressible liquid. The accumulator may function as a liquid storage reservoir in fluid communication with the damper. A hydraulic accumulator may include a bladder containing gas that is susceptible to excessive expansion, which may induce a high magnitude of stress. The present disclosure provides a hydraulic accumulator equipped with a flexible bladder allowed to expand according to its natural shape to prevent the creation of high areas of stress. The hydraulic accumulator of the present disclosure also provides a support that limits or prevents excessive expansion of the flexible bladder.

SUMMARY

This section provides a general summary of the disclosure, and is not a comprehensive disclosure of its full scope or all of its features.

In one form, the present disclosure provides an accumulator that includes a housing, flexible bladder and a support. The housing includes a chamber that has a defined volume and a passage extending through the housing. The passage is in fluid communication with the defined volume. The flexible bladder is positioned within the chamber and contains a compressible gas. The bladder being operable in an expanded condition and a partially collapsed condition. The support is positioned in the chamber and engages the flexible bladder when the flexible bladder is in the expanded condition to limit further expansion of the flexible bladder. A liquid is positioned in the chamber and is in contact with the flexible bladder. A volume of the liquid within the chamber is at a minimum when the flexible bladder is in the expanded condition. The volume of liquid within the chamber increases as a pressure of the liquid increases to compress the gas and operate the flexible bladder in the partially collapsed condition.

In some configurations of the accumulator of the above paragraph, the support includes a first guide spaced apart from a second guide. The first and second guides include first and second surfaces, respectively, shaped to conform with and engage opposing surfaces of the flexible bladder when the flexible bladder is in the expanded condition.

In some configurations of the accumulator of any one or more of the above paragraphs, the support includes another surface in conformity with an inner surface of the housing.

In some configurations of the accumulator of any one or more of the above paragraphs, the support includes an arm interconnecting the first guide and the second guide.

In some configurations of the accumulator of any one or more of the above paragraphs, the support is a monolithic component.

In some configurations of the accumulator of any one or more of the above paragraphs, the liquid passes through the passage when the flexible bladder changes between the expanded and partially collapsed conditions.

In some configurations of the accumulator of any one or more of the above paragraphs, the flexible bladder includes a spout in fluid communication with an interior volume of the flexible bladder. The spout extends at least partially through the housing.

In some configurations of the accumulator of any one or more of the above paragraphs, the flexible bladder includes first and second opposing surfaces. The support includes a third surface shaped to conform with the first surface of the flexible bladder. The first surface engages the third surface and the second surface engages an inner surface of the housing when the flexible bladder is in the expanded condition.

In some configurations of the accumulator of any one or more of the above paragraphs, the support includes a passage extending in an axial direction and a port extending in a radial direction. The liquid passes through the passage and the port when the flexible bladder changes between the expanded and partially collapsed conditions.

In some configurations of the accumulator of any one or more of the above paragraphs, the flexible bladder includes a pouch having a first surface and the housing includes a recess defining a second surface shaped to conform with and engage the first surface when the flexible bladder is in the expanded condition.

In another form, the present disclosure provides an accumulator that includes a housing, a flexible bladder and a support. The housing defines a chamber. The flexible bladder is disposed within the chamber and being at least partially filled with a compressible gas. The bladder being operable in an expanded condition and a partially collapsed condition. The support is disposed within the chamber and includes a first guide and a second guide diametrically opposed to the first guide. The flexible bladder being disposed between the first and second guides. The first and second guides engaging the flexible bladder when the flexible bladder is in the expanded condition to restrict further inflation of the flexible bladder. A liquid is positioned in the chamber and in contact with the flexible bladder. A volume of liquid positioned in the chamber is greater when the flexible bladder is in the partially collapsed condition than when the flexible bladder is in the expanded condition.

In some configurations of the accumulator of the above paragraph, the first and second guides include first and second surfaces, respectively, shaped to conform with and engage opposing surfaces of the flexible bladder when the flexible bladder is in the expanded condition.

In some configurations of the accumulator of any one or more of the above paragraphs, the support includes a connector interconnecting the first and second guides.

In some configurations of the accumulator of any one or more of the above paragraphs, a spout is securely received within a first opening of the flexible bladder. The flexible bladder is at least partially filled with compressible gas via the spout.

In some configurations of the accumulator of any one or more of the above paragraphs, the housing includes a second opening extending at least partially therethrough. The spout extends at least partially through the second opening.

In some configurations of the accumulator of any one or more of the above paragraphs, a plug is disposed within the second opening and sealingly engaged with a first surface of the second opening to prevent the compressible gas from leaving the flexible bladder.

In some configurations of the accumulator of any one or more of the above paragraphs, a sealing member sealingly engaged to a surface of the spout and a second surface of the second opening to prevent the liquid from leaving the accumulator.

In some configurations of the accumulator of any one or more of the above paragraphs, the flexible bladder has a pillow-shape.

In some configurations of the accumulator of any one or more of the above paragraphs, a plurality of flexible bladders is disposed within the chamber and partially filled with a compressible gas. The plurality of flexible bladders are circumferentially spaced apart from each other.

In yet another form, the present disclosure provides an accumulator that includes a housing, a flexible bladder, a monolithic support and a spout. The housing defines a chamber. The flexible bladder is disposed within the chamber and being at least partially filled with a compressible gas. The bladder being operable in an expanded condition and a partially collapsed condition. The support is disposed within the chamber and includes a first guide and a second guide diametrically opposed to the first guide. The flexible bladder being disposed between the first and second guides. The first and second guides engage the flexible bladder when the flexible bladder is in the expanded condition to restrict further inflation of the flexible bladder. The spout is securely received within an opening of the flexible bladder and extends at least partially through the housing. A liquid is positioned in the chamber and in contact with the flexible bladder. A volume of liquid positioned in the chamber is greater when the flexible bladder is in the partially collapsed condition than when the flexible bladder is in the expanded condition.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
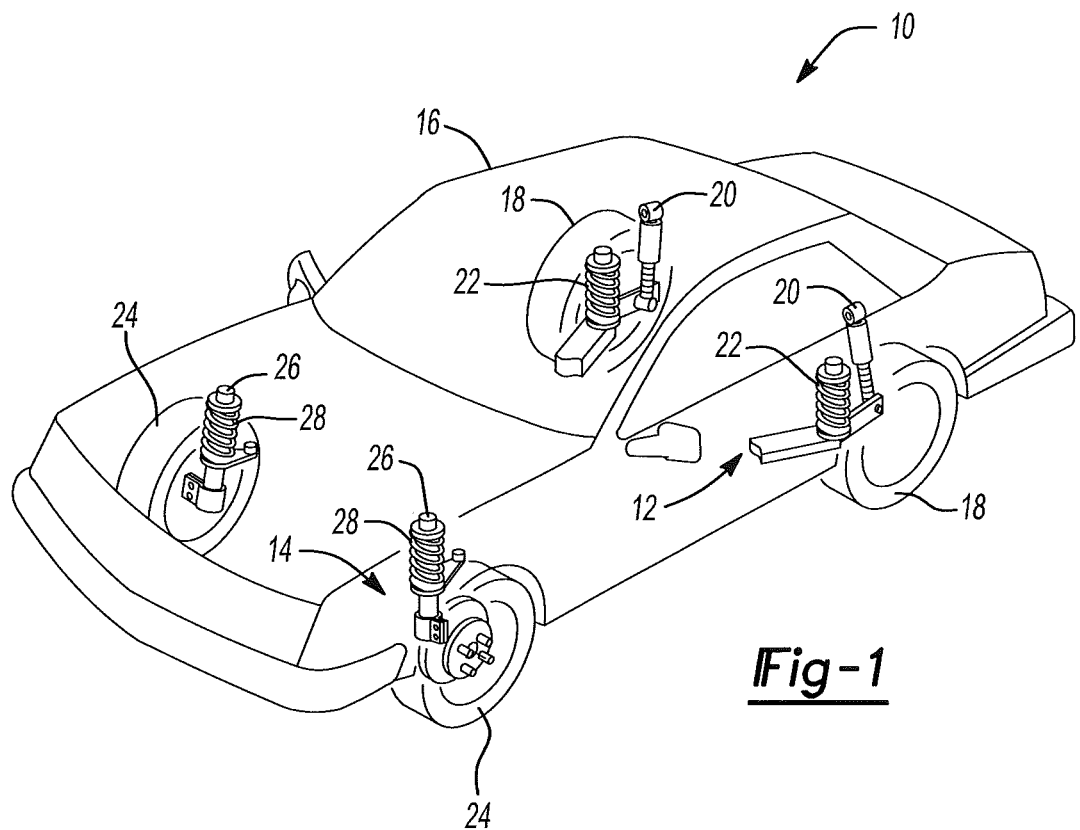
FIG. 1 is a diagrammatic illustration of a vehicle incorporating the energy harvesting suspension system in accordance with the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The following description is merely exemplary in nature and is not intended to limit the present disclosure, application, or uses. There is shown in FIG. 1, a vehicle incorporating a suspension system in accordance with the present disclosure and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of hydraulic actuators 20 and by a pair of springs 22. Similarly, front suspension 14 includes a transversely extending front axle assembly (not shown) to operatively support a pair of front wheels 24. The front axle assembly is attached to body 16 by means of a pair of hydraulic actuators 26 and by a pair of springs 28. Hydraulic actuators 20 and 26 serve to dampen the relative motion of the unsprung portion (i.e., front and rear suspensions 12, 14) with respect to the sprung portion (i.e., body 16) of vehicle 10. Sensors (not shown), at each wheel 18 and each wheel 24, sense the position and/or the velocity and/or the acceleration of body 16 in relation to rear suspension 12 and front suspension 14. While vehicle 10 has been depicted as a passenger car having front and rear axle assemblies, hydraulic actuators 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "hydraulic damper" as used herein is meant to refer to shock absorbers and hydraulic dampers in general and thus will include McPherson struts and other hydraulic damper designs known in the art.

Figure 2:
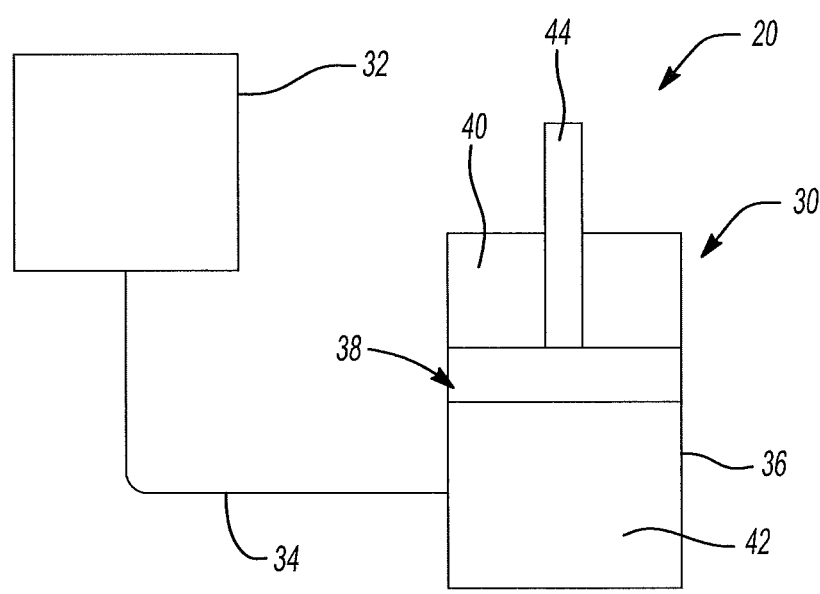
FIG. 2 is a schematic view of an actuator and an accumulator of one of the hydraulic actuators illustrated in FIG. 1.

Referring to FIG. 2, one of hydraulic actuators 20 is illustrated schematically. While FIG. 2 only illustrates hydraulic actuator 20, hydraulic actuators 26 include the same components discussed below for hydraulic actuator 20. The only difference between hydraulic actuators 20 and 26 may be the way in which the hydraulic actuator is attached to the sprung and/or unsprung portion of the vehicle.

Referring to FIG. 2, hydraulic actuator 20 includes, inter alia, an actuator 30 and an accumulator 32 in fluid communication with the actuator 30 via a conduit 34. The actuator 30 comprises a pressure tube 36, a piston 38 dividing the pressure tube 36 into an upper working or rebound chamber 40, a lower working or compression chamber 42 and a piston rod 44 extending through one end of the pressure tube 36. As shown in FIG. 2, the piston 38 is a closed piston without valving to control fluid flow through the piston 38, but the piston 38 can include valving to control fluid flow between the upper working chamber 40 and the lower working chamber 42.

Figure 3:
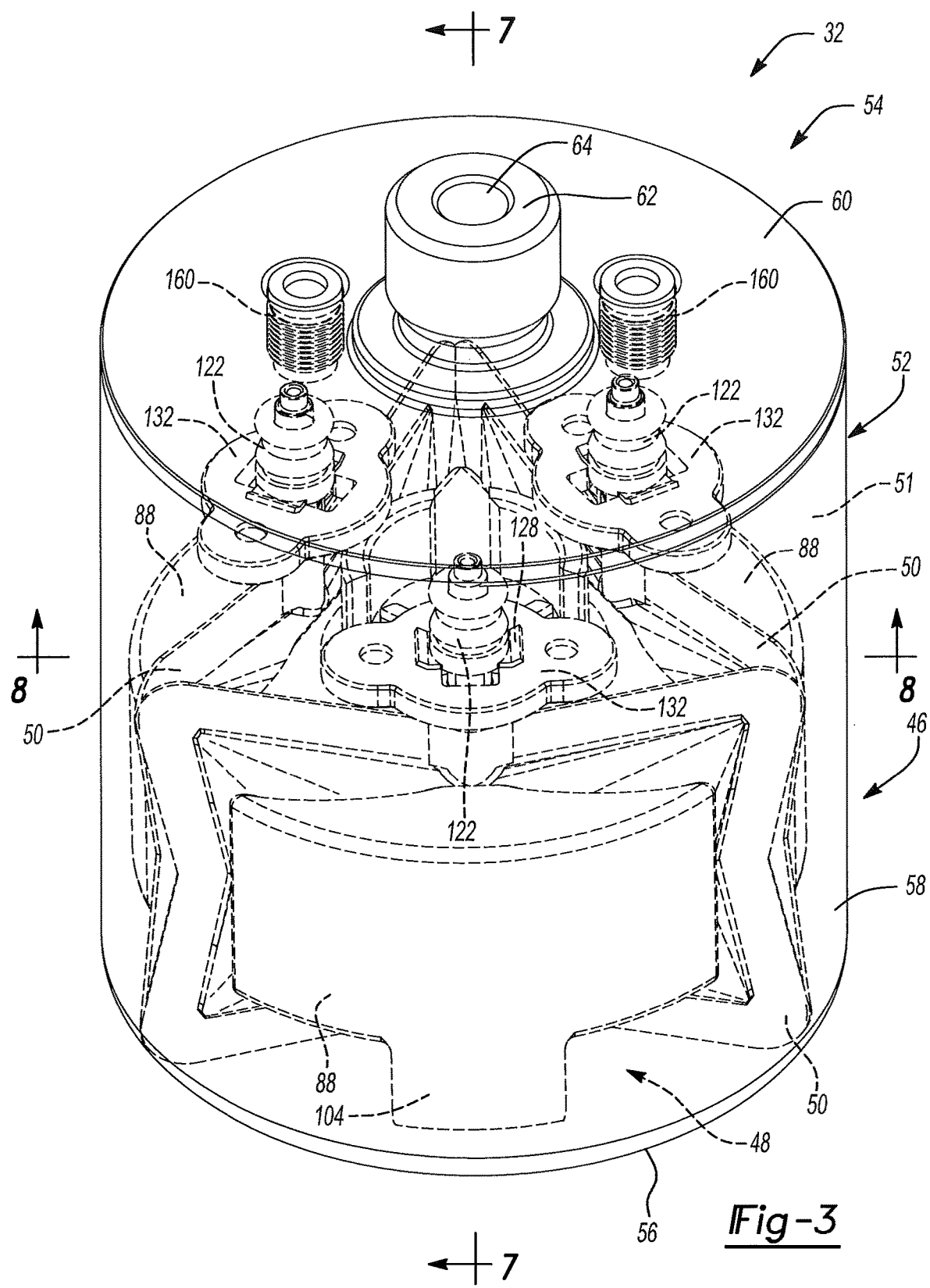
FIG. 3 is a perspective view of the accumulator of FIG. 2.
Figure 5:
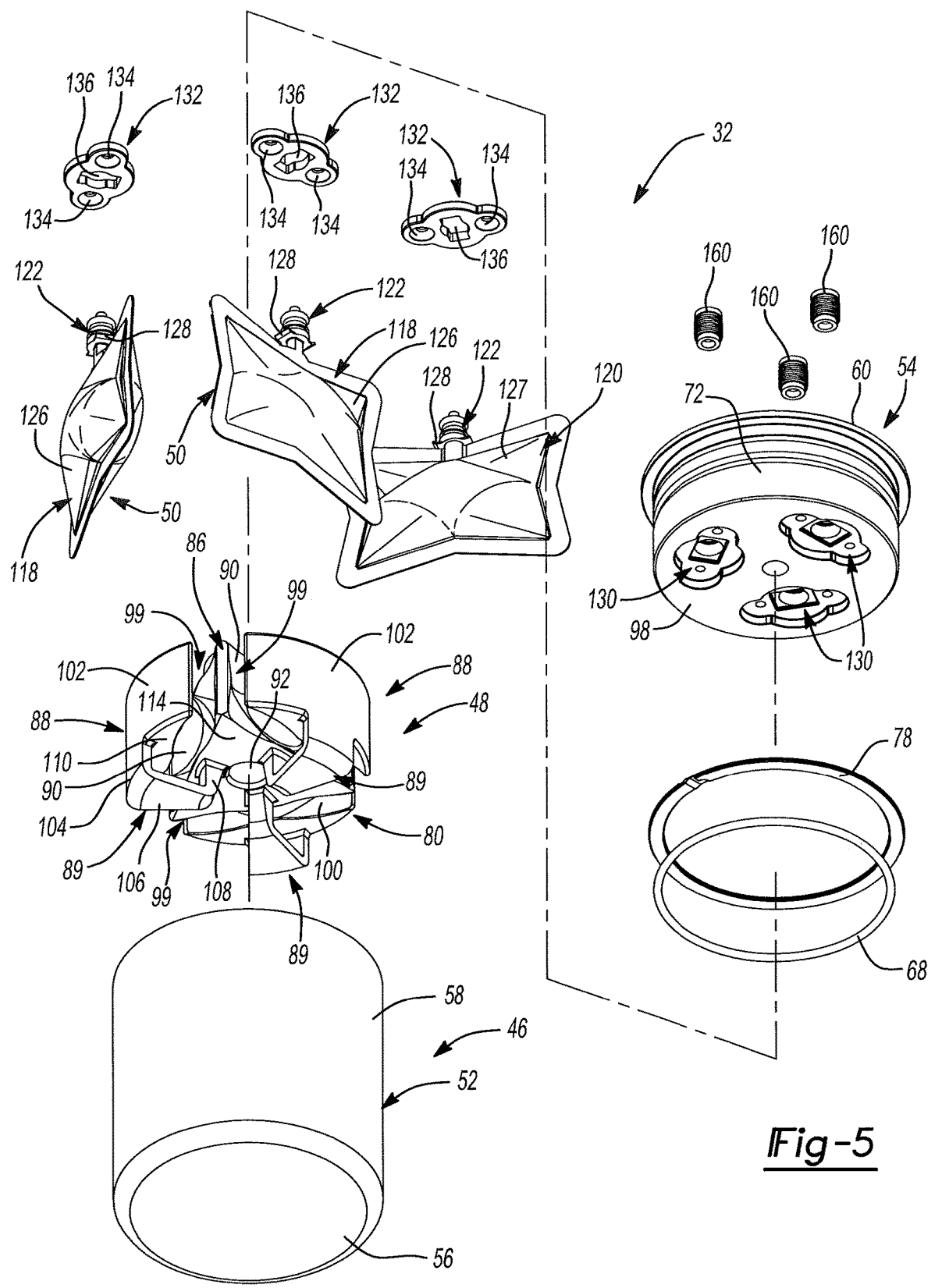
FIG. 5 is another exploded view of the accumulator of FIG. 3.
Figure 6:
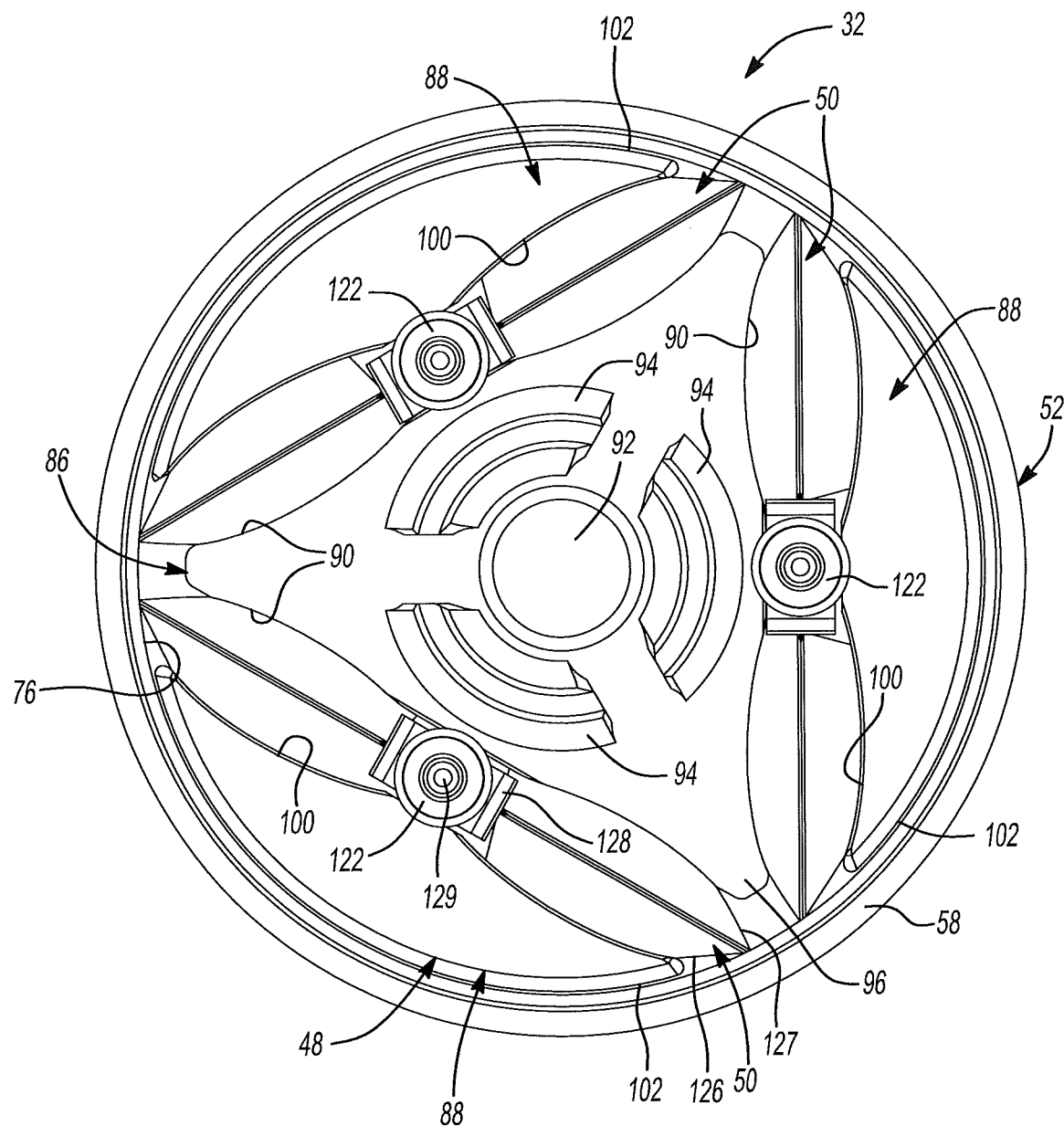
FIG. 6 is a top view of the accumulator with a cover removed.
Figure 7:
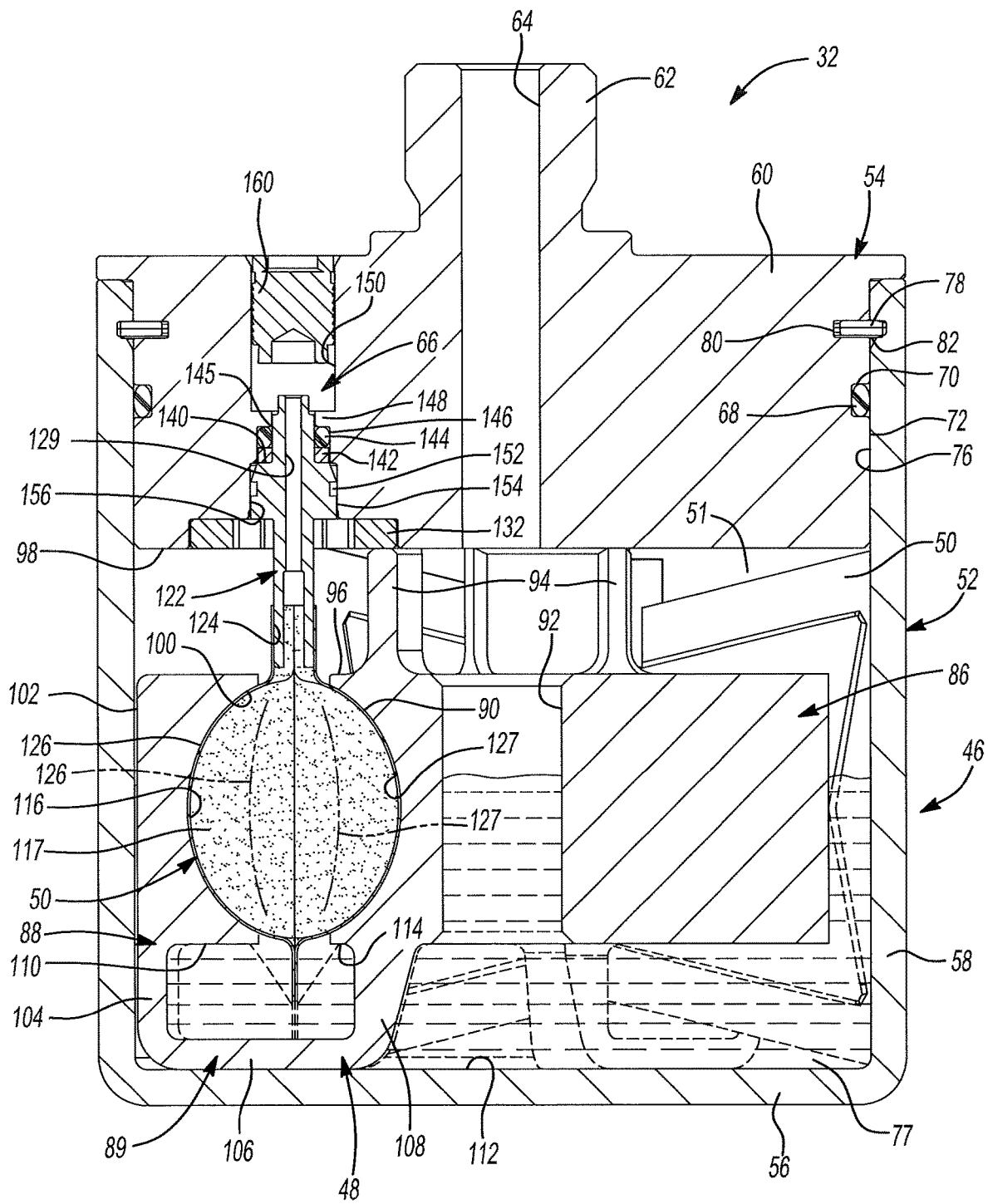
FIG. 7 is a cross-sectional view of the accumulator taken along line 7-7 of FIG. 3.
Figure 8:
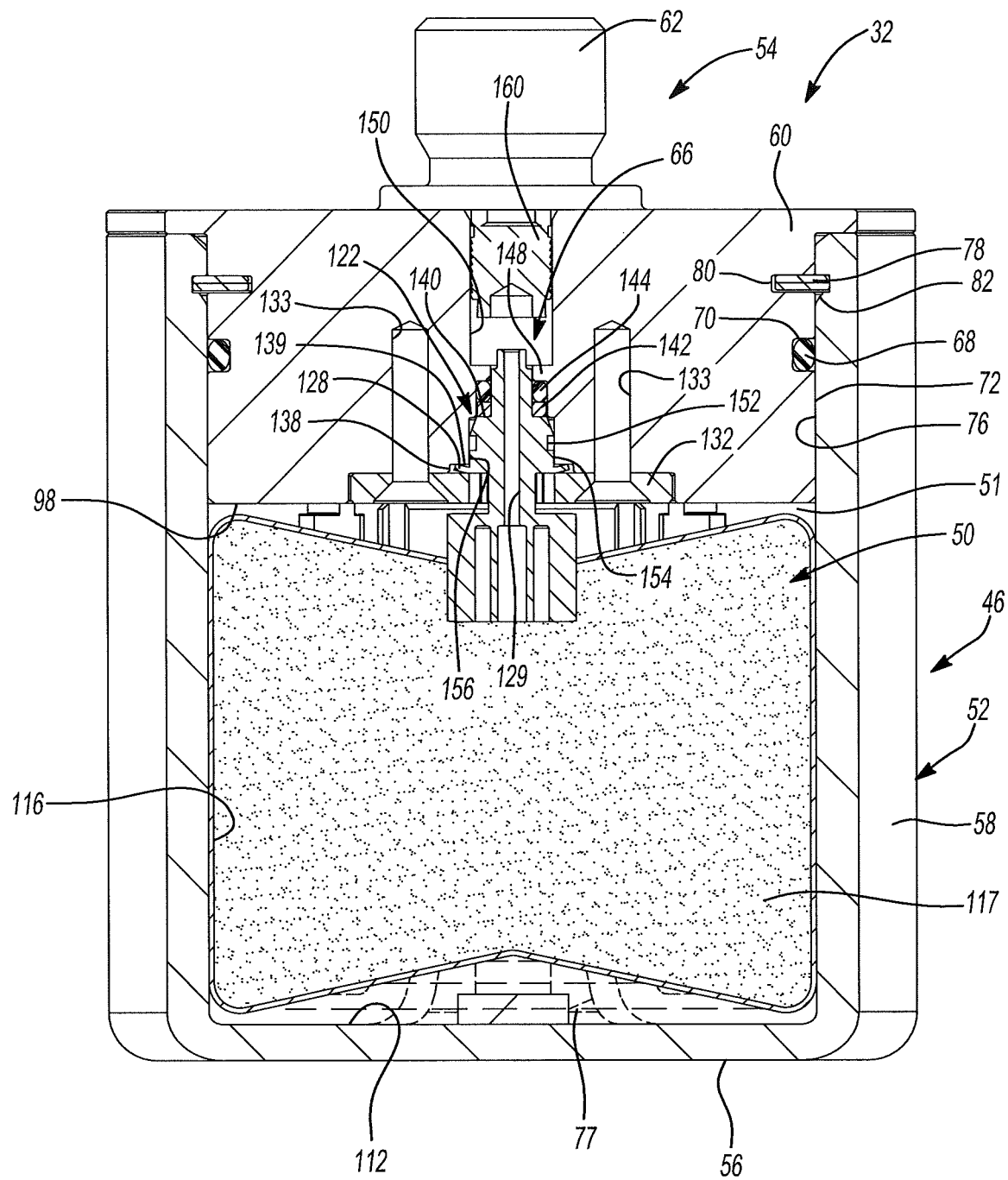
FIG. 8 is another cross-sectional view of the accumulator taken along line 8-8 of FIG. 3.
Figure 9:
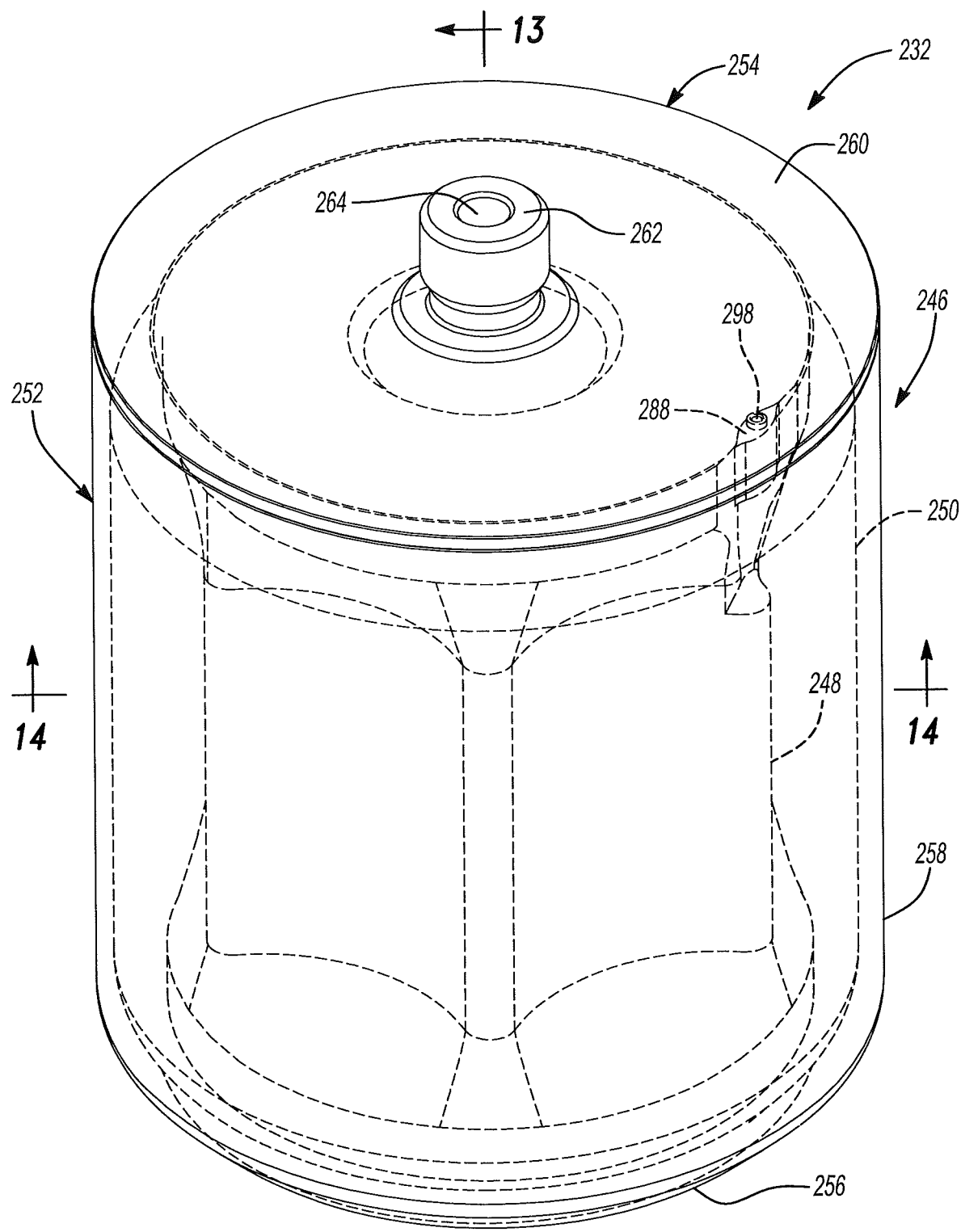
FIG. 9 is a perspective view of another accumulator.

With reference to FIGS. 3-8, the accumulator 32 includes a housing 46, a support 48 and a plurality of flexible bags or bladders 50. As shown in FIGS. 3, 7 and 8, the housing 46 may include a chamber 51 that has a defined volume. The housing 46 may also include a body 52 and a cap or cover 54. The body 52 may be a cylindrical-shape and may be made of a polymeric or metallic material, for example. The body 52 may include a base 56 and a sidewall 58 that extends from and around a periphery of the base 56.

Figure 4:
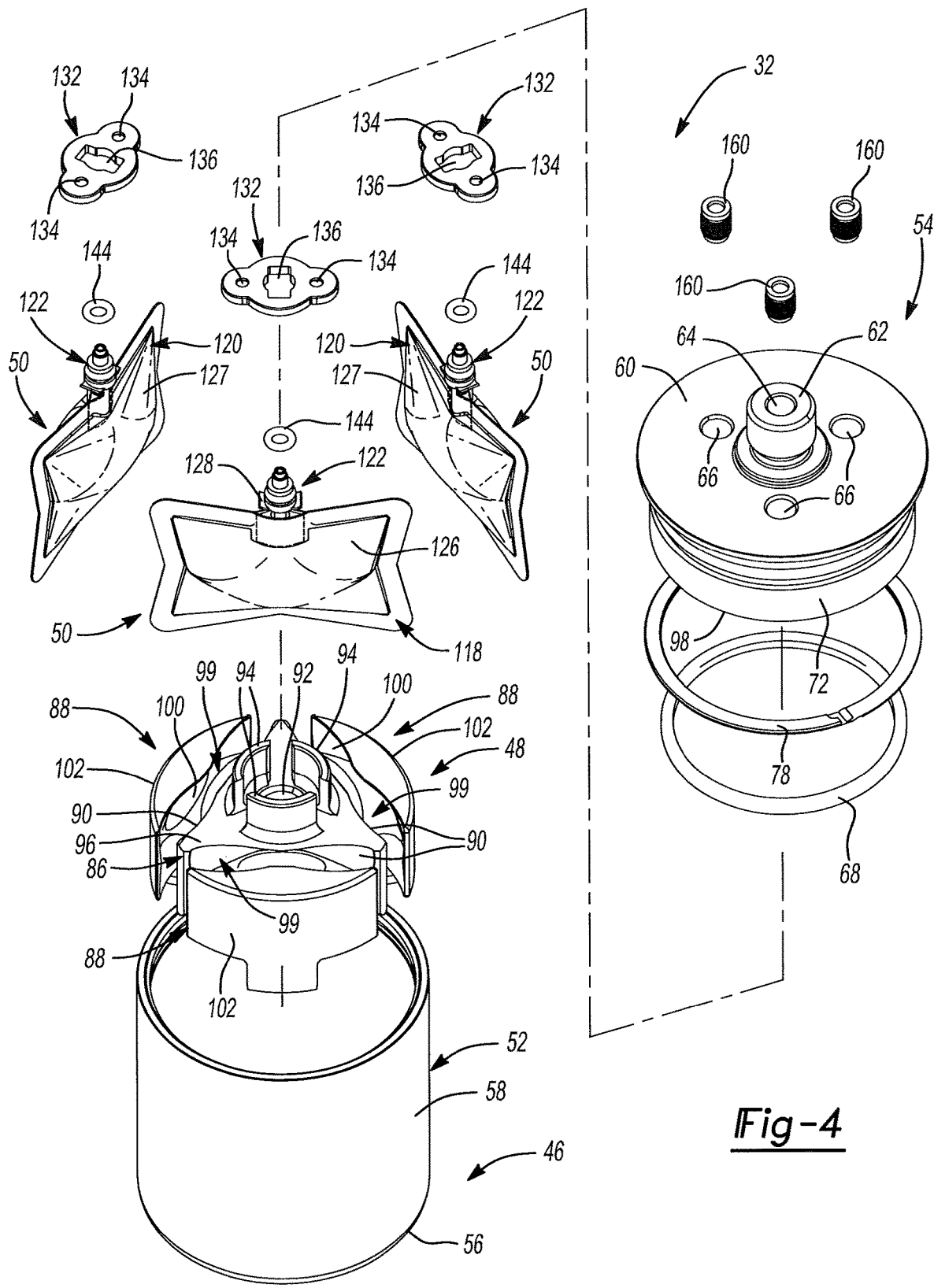
FIG. 4 is an exploded view of the accumulator of FIG. 3.

As shown in FIGS. 4 and 5, the cap 54 may be a cylindrical-shape and may be made of a polymeric or metallic material, for example. The cap 54 may be attached to an end of the body 52 and may include a body portion 60 and a connector portion 62 extending upwardly from a middle portion of the body portion 60. The cap 54 may also define a passage 64 and a plurality of stepped openings 66. The passage 64 may extend through the cap 54 (i.e., the body portion 60 and the connector portion 62) in an axial direction and may be in fluid communication with the chamber 51 and the conduit 34. The stepped openings 66 may be disposed around the passage 64 and may extend at least partially through the body portion 60 in an axial direction. The conduit 34 may be in fluid communication with the passage 64 and the lower working chamber 42. In some configurations, the conduit 34 may be in fluid communication with the passage 64 and the upper working chamber 40.

As shown in FIGS. 7 and 8, an annular-shaped sealing member 68 (e.g., an O-ring) may be disposed within a groove 70 formed in an outer cylindrical surface 72 of the body portion 60 of the cap 54. The sealing member 68 may be sealingly engage with an inner cylindrical surface 76 of the sidewall 58, thereby preventing fluid (e.g., liquid 77 such as oil) in the chamber 51 from leaving. As shown in FIGS. 7 and 8, a retaining ring 78 may be disposed within a groove 80 formed in the outer cylindrical surface 72 of the body portion 60 and a groove 82 formed in the inner cylindrical surface 76 of the sidewall 58. In this way, the cap 54 is further secured to the body 52.

The support 48 may be a monolithic component and may be positioned in the chamber 51. The support 48 may be made out of a polymeric or metallic material, for example. As shown in FIGS. 4 and 5, the support 48 may include a first or inner guide 86, a plurality of second or outer guides 88 and a plurality of arms or connectors 89. The first guide 86 may be a triangular-shape and may have a plurality of side surfaces 90 that are adjacent to each other. As shown in FIGS. 4-7, the first guide 86 may include a passage 92 that extends therethrough in an axial direction. The passage 92 may be in fluid communication with the chamber 51 and the passage 64. The passage 92 may also be aligned with the passage 64 (FIG. 7). A plurality of arcuate shaped projections 94 may extend upwardly from an upper surface 96 of the first guide 86 (i.e., the upper surface 96 extends perpendicular relative to the side surfaces 90). The projections 94 may be disposed around the passage 92 and may be spaced apart from each other. The projections 94 may also abut against an axial end surface 98 of the body portion 60 of the cap 54 (i.e., the axial end surface 98 that is exposed to the chamber 51). In this way, the support 48 is prevented from moving in the axial direction in the chamber 51.

As shown in FIGS. 4 and 5, each second guide 88 may be attached to the first guide 86 via a respective arm 89 such that a gap 99 is defined between the second guide 88 and the first guide 86. Each second guide 88 may be diametrically opposed to the first guide 86. In some configurations, each second guide 88 may be attached to the sidewall 58 of the body 52 as opposed to being attached to the first guide 86 via the respective arm 89. Each second guide 88 may include an inside surface 100 and an outside surface 102. The outside surface 102 may be in conformity with the inner cylindrical surface 76 of the sidewall 58. For example, the outside surface 102 may be curved such that the outside surface 102 is in conformity with the inner cylindrical surface 76. The outside surface 102 may also be adjacent to the inner cylindrical surface 76 (i.e., the outside surface 102 may abut against the inner cylindrical surface 76 or may be slightly spaced apart from the inner cylindrical surface 76). In this way, the support 48 is restricted from moving in a radial direction in the chamber 51.

As shown in FIG. 7, each arm 89 may have a U-shape or J-shape cross-section and may include an outer portion 104, an intermediate portion 106 and an inner portion 108. The outer portion 104 may extend downwardly in an axial direction from a periphery of a lower surface 110 of the second guide 88. The intermediate portion 106 may extend from an end of the outer portion 104 in a radial direction. The intermediate portion 106 may also contact a surface 112 of the base 56 of the body 52. In this way, the support 48 is prevented from moving in the axial direction in the chamber 51. The inner portion 108 may extend from an end of the intermediate portion 106 to a lower surface 114 of the first guide 86 (i.e., the lower surface 114 extends perpendicular relative to the side surfaces 90 and parallel relative to the upper surface 96).

As shown in FIG. 6, the plurality of flexible bags 50 may be positioned within the chamber 51 such that the flexible bags 50 are circumferentially spaced apart from each other. Each flexible bag 50 may be disposed in the gap 99 formed between the first guide 86 and a respective second guide 88. Each flexible bag 50 may be operable between an expanded condition (FIGS. 6 and 7) in which at least a portion of the flexible bag 50 engages the first and second guides 86, 88 and a partially collapsed condition (shown in phantom lines in FIG. 7) in which the flexible bag 50 is spaced apart from the first and second guides 86, 88. Each flexible bag 50 may have a pillow-shape and may define a cavity 116 that is at least partially filled with a fluid (e.g., a compressible gas 117 such as nitrogen) at a predetermined pressure. In this way, when each flexible bag 50 is at least partially filled with gas 117, each flexible bag 50 may inflate in its natural shape. Each flexible bag 50 may include first and second sheets 118, 120 and a spout 122.

In some configurations, each of the first and second sheets 118, 120 may have multiple layers. For example, each of the first and second sheets 118, 120 may have an inner layer that is made of a metallic material (e.g., aluminum). In this way, when each flexible bag 50 is at least partially filled with gas 117, the metallic material acts as a seal to prevent the gas 117 from leaking out of the flexible bag 50. Each of the first and second sheets 118, 120 may also have an outer layer with respect to the inner layer that is made of a polymeric material (e.g., polyamide). The first and second sheets 118, 120 may be attached (e.g., welded) to each other at peripheries thereof (FIGS. 4 and 5) such that the cavity 116 and an opening 124 are formed. Each of the first and second sheets 118, 120 may have surfaces 126, 127, respectively, that oppose each other. The surface 126 may be in conformity with the inside surface 100 of the respective second guide 88 and the surface 127 may be in conformity with a respective side surface 90 of the first guide 86. For example, the surface 126 may be curved to correspond to the curved inside surface 100 of the respective second guide 88 and the surface 127 may be curved to correspond to the respective curved side surface 90 of the first guide 86.

As shown in FIG. 7, when each flexible bag 50 is in the expanded condition, at least a portion of the surface 126 engages the inside surface 100 of the respective second guide 88 and at least a portion of the surface 127 engages the respective side surface 90 of the first guide 86. As shown in phantom lines in FIG. 7, when each flexible bag 50 is in the partially collapsed condition, the surface 126 is spaced apart from the inside surface 100 of the respective second guide 88 and the surface 127 is spaced apart from the respective side surface 90 of the first guide 86.

A portion of the spout 122 may be received within the opening 124 (FIG. 7) and may be secured to the first and second sheets 118, 120 by welding, for example. The spout 122 may also include a shoulder 128 (FIGS. 4, 5 and 8) and a passage 129 (FIG. 7). The shoulder 128 may extend outwardly from a middle portion of the spout 122. The passage 129 may extend through the spout 122 and may be in fluid communication with the cavity 116 of the flexible bag 50.

As shown in FIG. 5, a plurality of recesses 130 may be formed in the axial end surface 98 of the body portion 60 and may be positioned around the passage 64. A bracket 132 may be positioned in a corresponding recess 130 (FIG. 7) and may include a plurality of first openings 134 and a second opening 136. A fastener (not shown) may extend through a respective first opening 134 and through an opening 133 (FIG. 8) of the body portion 60 to secure the bracket 132 to the cap 54. The second opening 136 may be a rectangular-shape and may be disposed between two of the first openings 134. The shoulder 128 of the spout 122 may be aligned with the second opening 136 such that the spout 122 may be inserted into a respective stepped opening 66 of the body portion 60 via the second opening 136 (FIGS. 7 and 8). When the shoulder 128 extends through the second opening 136 and into a groove 138 of the body portion 60 (FIG. 8), the spout 122 may be rotated 90 degrees clockwise (or counter-clockwise), thereby securing the spout 122 to the cap 54. That is, when the spout 122 is secured to the cap 54, the shoulder 128 is positioned between and contacts a surface 139 of the groove 138 and the bracket 132 to prevent axial movement of the spout 122. An annular surface 140 of the spout 122 may also engage a buffer ring 142 disposed within the stepped opening 66.

As shown in FIGS. 7 and 8, an annular-shaped sealing member 144 (e.g., an O-ring) may be disposed within a respective stepped opening 66 and may be sealingly engaged with a first cylindrical surface 145 of the spout 122 and a first cylindrical surface 146 of the stepped opening 66. In this way, liquid 77 in the chamber 51 is prevented from leaking out. The sealing member 144 may also be positioned between a flange 148 that extends radially inwardly from a second cylindrical surface 150 of the stepped opening 66 and the buffer ring 142. The second cylindrical surface 150 has a larger diameter than the first cylindrical surface 146. A groove 152 may be formed in and extend around a second cylindrical surface 154 of the spout 122. In some configurations, an annular-shaped sealing member (not shown) may be disposed within the groove 152 and may be sealingly engaged with a third cylindrical surface 156 of the stepped opening 66, thereby preventing liquid 77 in the chamber 51 from leaking out. A cylindrical-shaped plug 160 may be disposed within a respective stepped opening 66 and may be sealingly engaged with the second cylindrical surface 150.

Liquid 77 may be positioned in the chamber 51 and in contact with the flexible bags 50. A volume of the liquid 77 within the chamber 51 is at a minimum when the flexible bags 50 are in the expanded condition. The volume of liquid 77 within the chamber 51 increases as a pressure of the liquid 77 increases to compress the gas 117 in the flexible bags 50 and operate the flexible bags 50 in the partially collapsed condition (FIG. 7; one of the flexible bags 50 is shown in phantom lines in the partially collapsed condition). The liquid 77 passes through the passage 64 (via the conduit 34 and the lower working chamber 42) when the flexible bags 50 change between the expanded condition and the partially collapsed condition. A volume of the cavity 116 of the flexible bags 50 decreases as the flexible bags 50 change from the expanded condition to the partially collapsed condition.

With reference to FIGS. 1-8, assembly of the accumulator 32 will be described in detail. The support 48 is disposed within the body 52 such that the intermediate portions 106 of the arms 89 abut against the surface 112 of the base 56 and the plurality of second guides 88 are adjacent to the inner cylindrical surface 76 of the body 52 (i.e., the outside surface 102 of each second guide 88 may abut against the inner cylindrical surface 76 or may be slightly spaced apart from the inner cylindrical surface 76). In this way, the support 48 is restricted from moving in a radial direction and prevented from moving downwardly in the axial direction.

The brackets 132 are positioned in corresponding recesses 130 of the cap 54 and are attached thereto via fasteners (not shown). The shoulder 128 of each spout 122 is aligned with the second opening 136 of a respective bracket 132 such that the spout 122 is inserted into the respective stepped opening 66 of the body portion 60 via the second opening 136. When the shoulder 128 extends through the second opening 136 and into the groove 138 of the body portion 60, the spout 122 is rotated 90 degrees clockwise (or counter-clockwise), thereby securing the spout 122 to the cap 54. The cap 54 is then attached to the body 52. When the cap 54 is attached to the body 52, each flexible bag 50 is disposed in the gap 99 formed between the first guide 86 and a respective second guide 88. When the cap 54 is attached to the body 52, the projections 94 abut against the axial end surface 98 of the body portion 60 of the cap 54, thereby preventing the support 48 from moving upwardly in the axial direction.

A gas tank (not shown) may connect to each spout 122 to charge the flexible bags 50. That is, the gas tank may at least partially fill each flexible bag 50 with gas 117 at a predetermined pressure. In some configurations, after each flexible bag 50 is at least partially filled with gas 117 at the predetermined pressure, each spout 122 may be melted by a thermal process to prevent the gas 117 in each flexible bag 50 from leaking out. In other configurations, each flexible bag 50 may be in fluid communication with each other via fluid lines (not shown) and one of the flexible bags 50 may include the spout 122 attached thereto. In such configurations, filling the one of the flexible bags 50 with gas 117 via the spout 122 causes the other flexible bags 50 to be filled with gas 117 at a predetermined pressure. The plug 160 may be disposed within the respective stepped opening 66 and may be sealingly engaged with the second cylindrical surface 150 of the respective stepped opening 66.

After the accumulator 32 has been fully assembled, the actuator 30 is connected to the accumulator 32 via the conduit 34 so that the lower working chamber 42 is in fluid communication with the chamber 51. Liquid from the lower working chamber 42 is initially positioned within the chamber 51 (via the conduit 34 and the passage 64) such that a pressure of the liquid 77 within the chamber 51 is equal to a pressure of the gas 117 within the flexible bags 50. The volume of liquid 77 within the chamber 51 may increase to compress the gas 117 in the flexible bags 50 and operate the flexible bags 50 in the partially collapsed condition (FIG. 7; one of the flexible bags 50 is shown in phantom lines in the partially collapsed condition). The volume of the liquid 77 within the chamber 51 may be at a minimum when the flexible bags 50 are in the expanded condition such that the flexible bags 50 engage the support 48 to limit further expansion of the flexible bags 50.

One benefit of the accumulator 32 of the present disclosure is that the support 48 limits expansion or prevents excessive expansion of the flexible bags 50 when the liquid 77 within the chamber 51 is at a minimum, for example. Another benefit of the accumulator 32 of the present disclosure is that each flexible bag 50 expands in its natural shape, thereby preventing the creation of high areas of stress in the flexible bag 50.

With reference to FIGS. 9-14, another accumulator 232 may be incorporated into the hydraulic actuator 20 instead of accumulator 32. The structure and function of the accumulator 232 may be similar or identical to the accumulator 32 described above, apart from any exception noted below.

With reference to FIGS. 9-14, the accumulator 232 may include a housing 246, a support 248 and a flexible bag or bladder 250. The housing 246 may include a chamber 251 that has a defined volume. The housing 246 may also include a body 252 and a cap or cover 254. The body 252 may be a cylindrical-shape and may be made of a polymeric or metallic material, for example. The body 252 may be hollow and may include a base 256 and a sidewall 258 that extends from and around a periphery of the base 256.

The cap 254 may be an annular-shape and may be made of a polymeric or metallic material, for example. The cap 254 may be attached (e.g., welded) to an end of the body 252 such that a seal is created between the cap 254 and the body 252. As shown in FIGS. 9-11 and 13, the cap 254 may include a body portion 260 and a connector portion 262 extending upwardly from a middle portion of the body portion 260. The cap 254 may also define a passage 264 that extends therethrough (i.e., the passage 264 extends through the body portion 260 and the connector portion 262) in an axial direction. The conduit 34 may be in fluid communication with the passage 264 and the lower working chamber 42.

Figure 13:
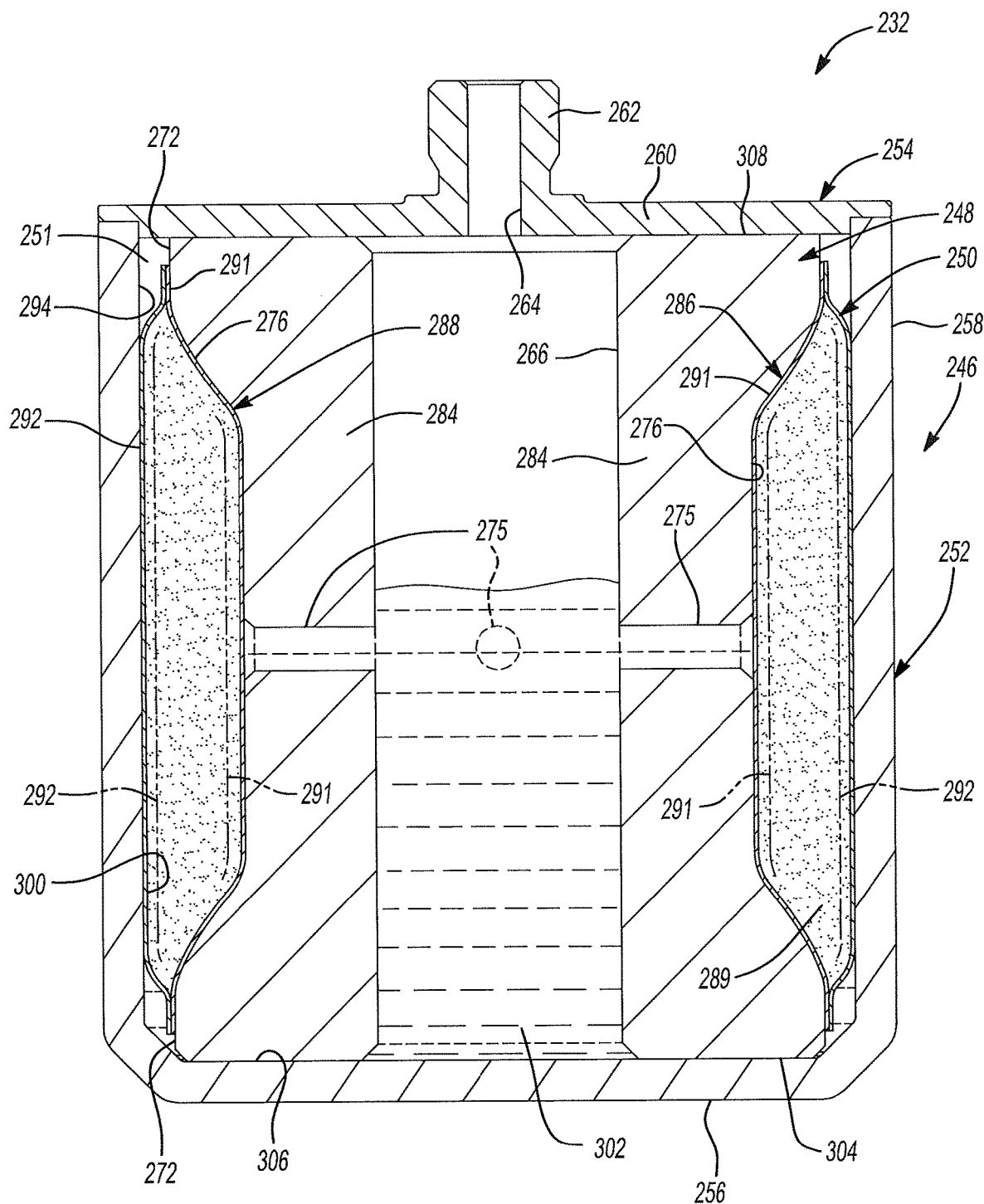
FIG. 13 is a cross-sectional view of the accumulator taken along line 13-13 of FIG. 9.
Figure 14:
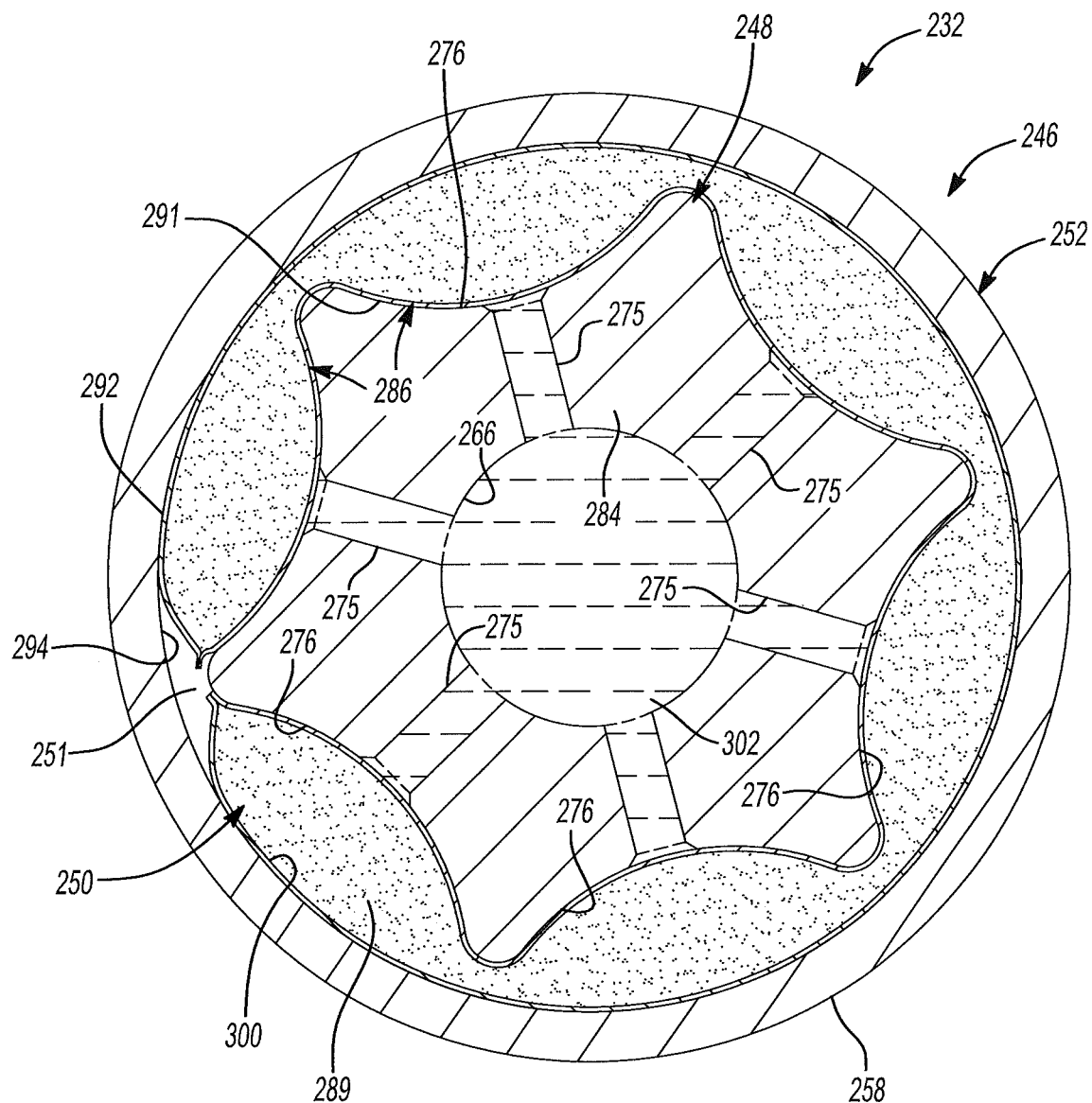
FIG. 14 is another cross-sectional view of the accumulator taken along line 14-14 of FIG. 9.

The support 248 may be positioned in the chamber 251 and may be a monolithic component. The support 248 may be made out of a polymeric or metallic material, for example, and may be a cylindrical-shape. As shown in FIG. 13, the support 248 may include a passage 266 that extends therethrough in an axial direction. The passage 266 may be in fluid communication with the chamber 251 and with the passage 264 of the cap 254. The support 248 may also include first and second end portions 268, 269 and an intermediate portion 270.

Figure 10:
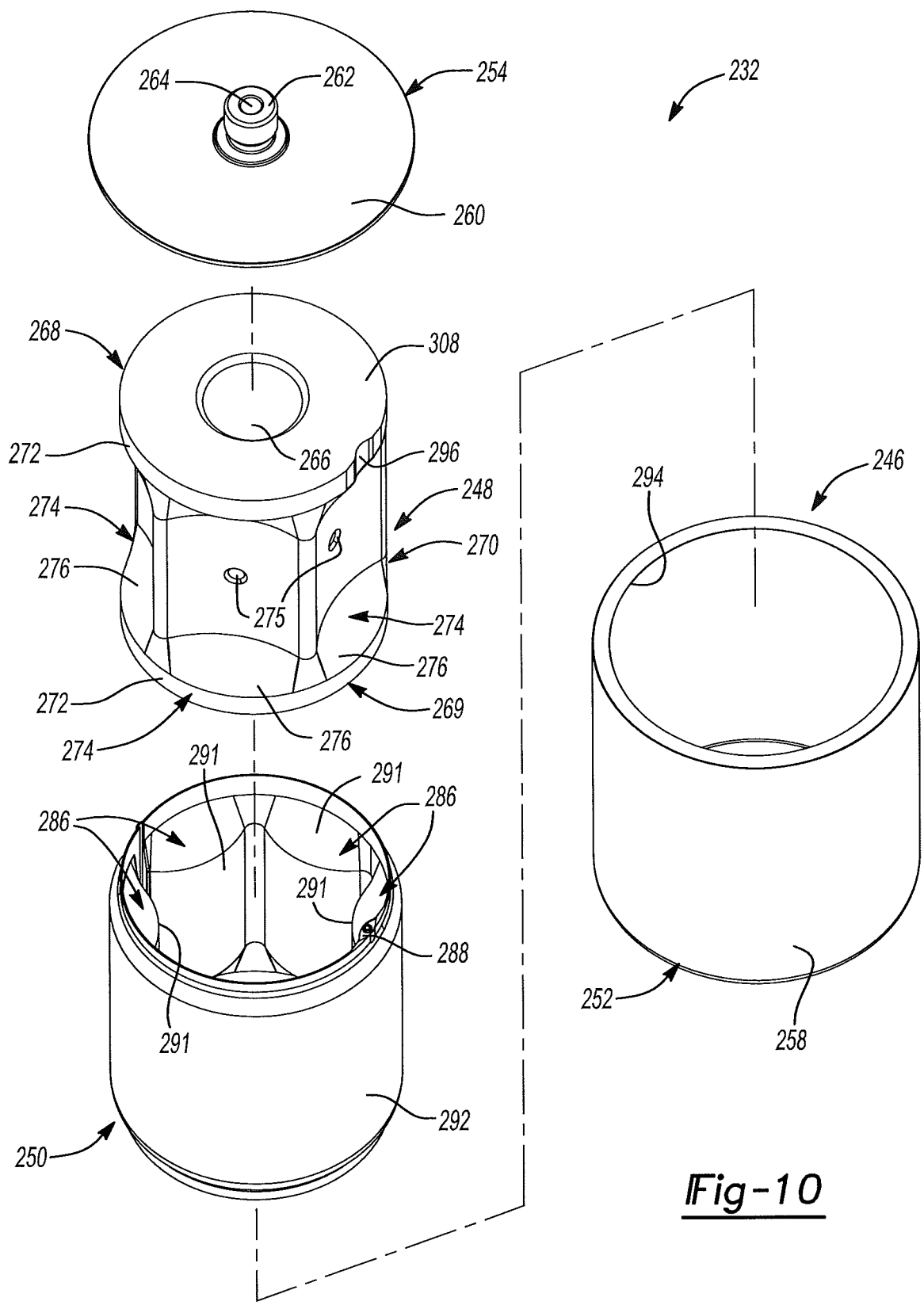
FIG. 10 is an exploded view of the accumulator of FIG. 9.
Figure 11:
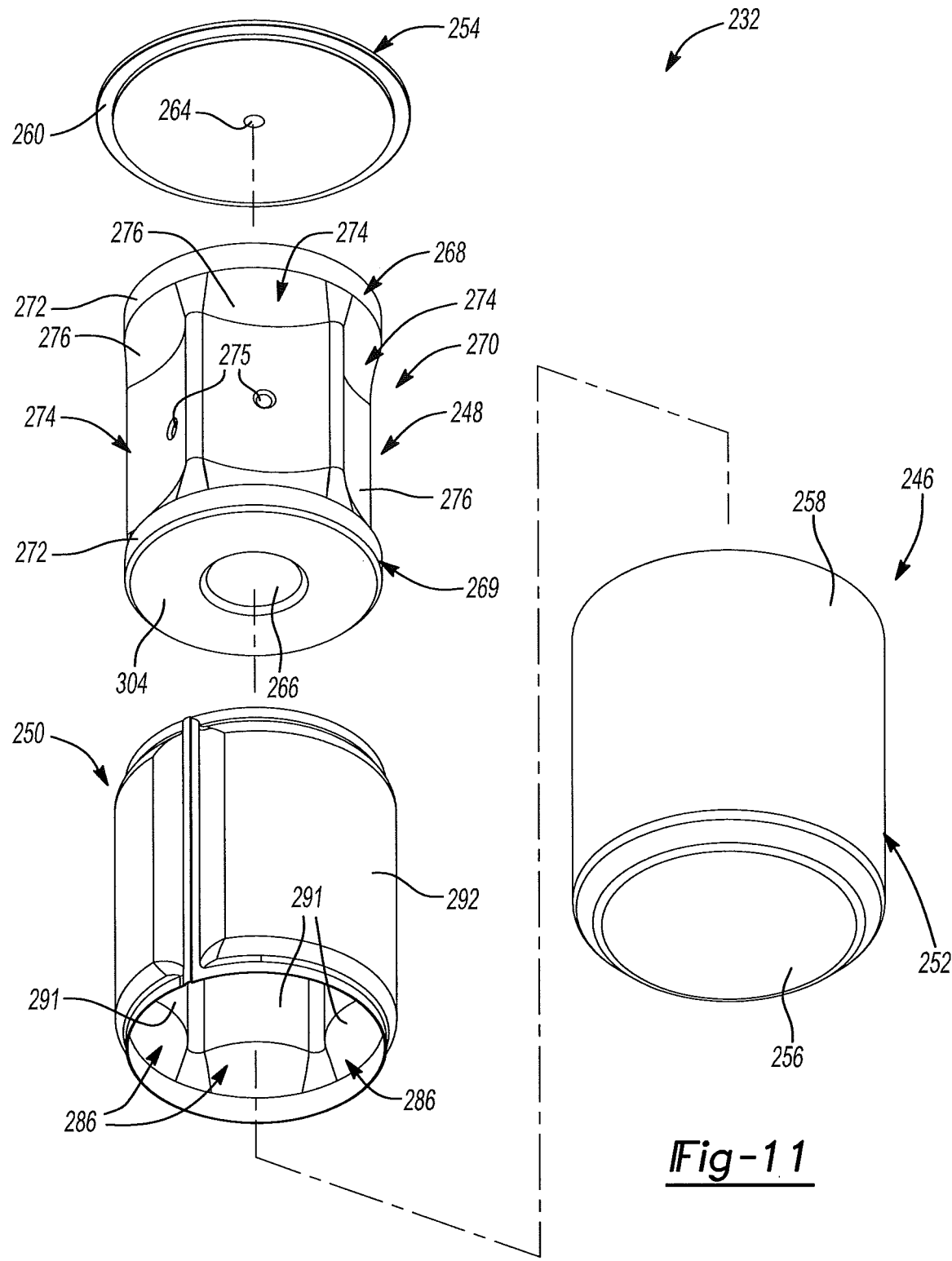
FIG. 11 is another exploded view of the accumulator of FIG. 9.
Figure 12:
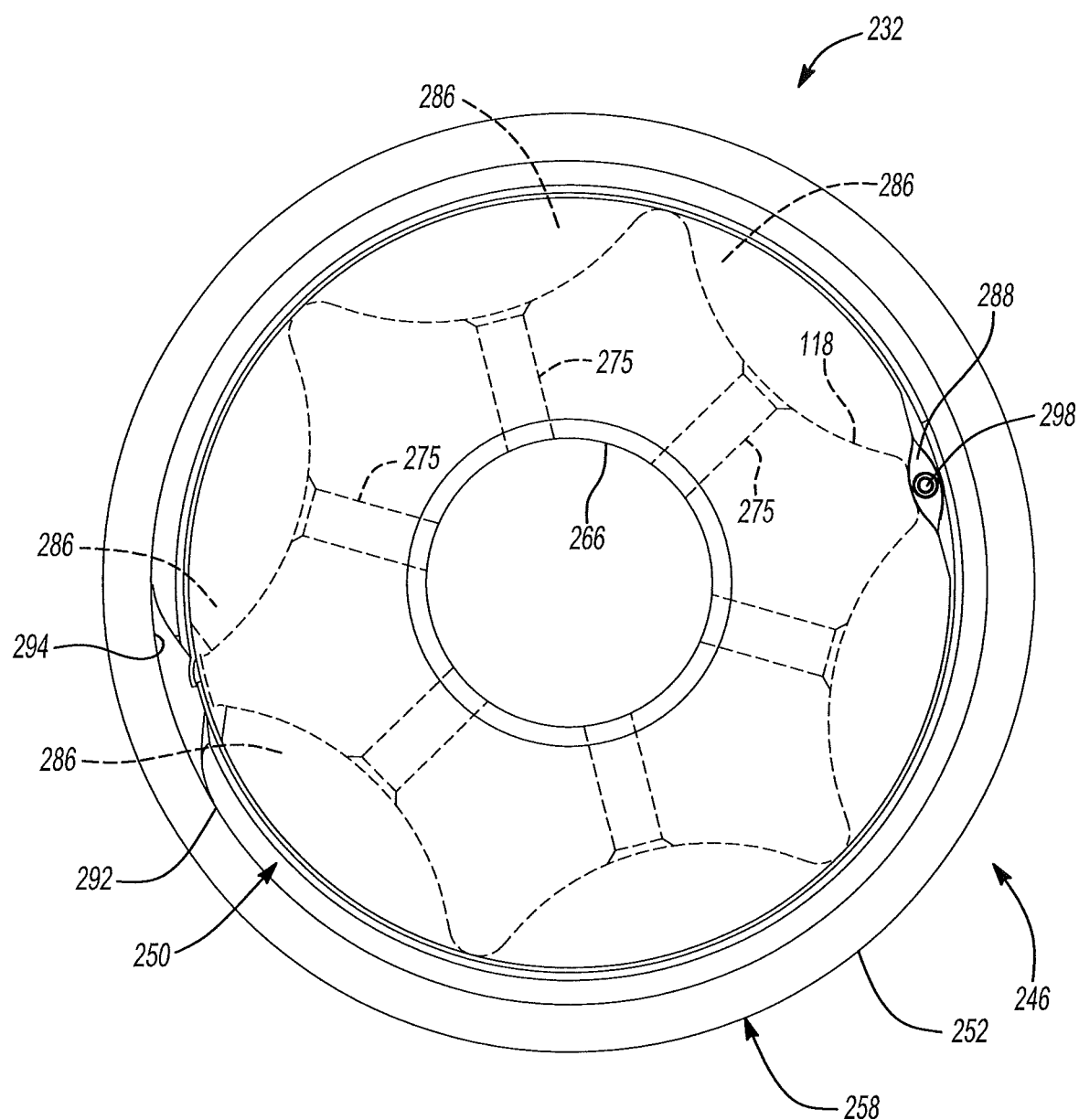
FIG. 12 is a top view of the accumulator of FIG. 9 with a cover removed.

As shown in FIGS. 10 and 11, each of the first and second end portions 268, 269 has an outer diametrical surface 272. The intermediate portion 270 includes a plurality of recesses 274 and a plurality of ports 275. As shown in FIGS. 10 and 11, each recess 274 may define a surface 276. The surface 276 may be curved.

The plurality of ports 275 may be positioned around the intermediate portion 270. As shown in FIG. 13, each port 275 may extend radially through a wall 284 of the intermediate portion 270. In this way, each port 275 may be in fluid communication with the passage 266 and the chamber 251.

The flexible bag 250 may be positioned within the chamber 251 between the support 248 and the body 252. The flexible bag 250 may be operable between an expanded condition (FIG. 13) in which at least a portion of the flexible bag 250 engages the body 252 and the support 248, and a partially collapsed condition (FIG. 13; the flexible bag 250 shown in phantom lines in the partially collapsed condition) in which the flexible bag 250 is spaced apart from the body 252 and the support 248. The flexible bag 250 may include a plurality of pouches 286 and a spout 288. The flexible bag 250 may be at least partially filled with fluid (e.g., a compressible gas 289 such as nitrogen) at a predetermined pressure.

When the flexible bag 250 is in the expanded condition, each pouch 286 is received in a respective recess 274 of the intermediate portion 270 such that a surface 291 of each pouch 286 engages the surface 276 of the respective recess 274. An outer cylindrical surface 292 of the flexible bag 250 also engages an inner cylindrical surface 294 of the sidewall 258. When the flexible bag 250 is in the partially collapsed condition, the surface 291 is spaced apart from the surface 276 of the respective recess 274 and the outer cylindrical surface 292 of the flexible bag 250 is spaced apart from the inner cylindrical surface 294 the sidewall 258. Each pouch 286 may be in conformity with the respective recess 274.

The spout 288 may be received within an opening (not shown) of the flexible bag 250 and may be secured to the flexible bag 250 by welding, for example. The spout 288 may also be disposed in a groove 296 formed in the outer diametrical surface 272 of the first end portion 268 once the flexible bag 250 is positioned in the chamber 251. The spout 288 may include a passage 298 that extends therethrough and is in fluid communication with a cavity 300 of the flexible bag 250.

A liquid 302 may be positioned in the chamber 251 and in contact with the flexible bag 250. A volume of the liquid 302 within the chamber 251 is at a minimum when the flexible bag 250 is in the expanded condition. The volume of liquid 302 within the chamber 251 increases as a pressure of the liquid 302 increases to compress the gas 289 in the flexible bag 250 and operate the flexible bag 250 in the partially collapsed condition. A volume of the cavity 300 of the flexible bag 250 decreases as the flexible bag 250 changes from the expanded condition to the partially collapsed condition.

With reference to FIGS. 9-14, assembly of the accumulator 232 will be described in detail. The support 248 is disposed within the body 252 such that a lower surface 304 abuts against a surface 306 of the base 256. In this way, the support 248 is prevented from moving downwardly in the axial direction. The flexible bag 250 is positioned in the chamber 251 between the support 248 and the body 252.

A gas tank (not shown) may connect to the spout 288 and may charge the flexible bag 250. That is, the gas tank may at least partially fill the flexible bag 250 with gas 289 at a predetermined pressure. After the flexible bag 250 is at least partially filled with gas 289 at the predetermined pressure, the spout 288 is melted by a thermal process to prevent the gas 289 in the flexible bag 250 from leaking out.

The cap 254 is then attached to the body 252 such that a seal is created between the cap 254 and the body 252. When the cap 254 is attached to the body 252, an upper surface 308 of the support 248 abuts against the cap 254 to prevent the support 248 from moving upwardly in the axial direction.

After the accumulator 232 has been fully assembled, the actuator 30 is connected to the accumulator 232 via the conduit 34 so that the lower working chamber 42 is in fluid communication with the chamber 251. Liquid from the lower working chamber 42 is initially positioned within the chamber 251 (via the conduit 34, the passages 264, 266 and the ports 275) such that a pressure of the liquid 302 within the chamber 251 is initially equal to a pressure of the gas 289 within the flexible bag 250. The volume of liquid 302 within the chamber 251 may increase to compress the gas 289 in the flexible bag 250 and operate the flexible bag 250 in the partially collapsed condition. The volume of the liquid 302 within the chamber 251 may be at a minimum when the flexible bag 250 is in the expanded condition such that the flexible bag 250 engages the support 248 and the body 252 to limit further expansion of the flexible bag 250.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An accumulator comprising:
   a housing including a chamber having a defined volume and a passage extending through the housing, the passage in fluid communication with the defined volume;
   first and second flexible bladders spaced apart from one another positioned within the chamber and each containing a compressible gas, the bladders being operable in an expanded condition and a partially collapsed condition;
   a support positioned in the chamber and engaging the flexible bladders when the flexible bladders are in the expanded condition to limit further expansion of the flexible bladders; and
   a liquid positioned in the chamber and in contact with the flexible bladder, wherein a volume of the liquid within the chamber is at a minimum when the flexible bladders are in the expanded condition, the volume of liquid within the chamber increasing as a pressure of the liquid increases to compress the gas and operate the flexible bladders in the partially collapsed condition,
   wherein the support includes an inner guide, an outer guide and another outer guide, the inner and outer guides including first and second surfaces, respectively, shaped to conform with and engage external surfaces of the first flexible bladder when the first flexible bladder is in the expanded condition, the inner guide and the another outer guide including third and fourth surfaces, respectively, shaped to conform with and engage external surfaces of the second flexible bladder when the second flexible bladder is in the expanded condition.

2. The accumulator of claim 1, wherein the support includes another surface in conformity with an inner surface of the housing.

3. The accumulator of claim 2, wherein the support includes an arm interconnecting the inner guide and the outer guide.

4. The accumulator of claim 3, wherein the support is a monolithic component.

5. The accumulator of claim 1, wherein the liquid passes through the passage when the first flexible bladder changes between the expanded and partially collapsed conditions.

6. The accumulator of claim 1, wherein the first flexible bladder includes a spout in fluid communication with an interior volume of the flexible bladder, the spout extending through the housing.

7. The accumulator of claim 1, wherein the support includes a passage extending in an axial direction and a port extending in a radial direction, and wherein the liquid passes through the passage and the port when the flexible bladders change between the expanded and partially collapsed conditions.

8. The accumulator of claim 1, wherein the first flexible bladder includes a pouch having an outer surface and the housing includes a recess defining an engagement surface shaped to conform with and engage the outer surface when the first flexible bladder is in the expanded condition.

9. An accumulator comprising:
a housing defining a chamber;
a flexible bladder disposed within the chamber and being at least partially filled with a compressible gas, the bladder being operable in an expanded condition and a partially collapsed condition;
a support disposed within the chamber and including an inner guide spaced apart from an outer guide, with a gap therebetween, the flexible bladder being positioned within the gap, the inner and outer guides engaging outer surfaces of the flexible bladder when the flexible bladder is in the expanded condition to restrict further inflation of the flexible bladder; and
a liquid positioned in the chamber and in contact with the flexible bladder, wherein a volume of liquid positioned in the chamber is greater when the flexible bladder is in the partially collapsed condition than when the flexible bladder is in the expanded condition,
the accumulator further comprising two additional flexible bladders disposed within the chamber and partially filled with a compressible gas, and wherein the flexible bladders are circumferentially spaced apart from each other.

10. The accumulator of claim 9, wherein the inner and outer guides include first and second surfaces, respectively, shaped to conform with and engage opposing surfaces of the flexible bladder positioned within the gap when the flexible bladder is in the expanded condition.

11. The accumulator of claim 9, wherein the support includes a connector interconnecting the inner and outer guides.

12. The accumulator of claim 9, further comprising a spout securely received within a first opening of the flexible bladder positioned within the gap, and wherein the flexible bladder positioned within the gap is at least partially filled with compressible gas via the spout.

13. The accumulator of claim 12, wherein the housing includes a second opening extending at least partially therethrough, and wherein the spout extends at least partially through the second opening.

14. The accumulator of claim 13, further comprising a plug disposed within the second opening and sealingly engaged with a first surface of the second opening to prevent the compressible gas from leaving the flexible bladder positioned within the gap.

15. The accumulator of claim 14, further comprising a sealing member sealingly engaged to a surface of the spout and a second surface of the second opening to prevent the liquid from leaving the accumulator.

16. The accumulator of claim 9, wherein the flexible bladder positioned within the gap includes a thermally deformable portion operable to seal the bladder when heated.

* * * * *